United States Patent [19]

York

[11] 4,209,074
[45] Jun. 24, 1980

[54] ADJUSTABLE CONTROL CONSOLE

[75] Inventor: Lyle E. York, Peoria, Ill.

[73] Assignee: Caterpillar Tractor Co., Peoria, Ill.

[21] Appl. No.: 38,985

[22] Filed: Jan. 15, 1979

[51] Int. Cl.² .......................... B62D 1/18; B60K 26/00
[52] U.S. Cl. ......................................... 180/78; 74/493; 280/775
[58] Field of Search .......... 180/77 L, 77 TC, 77 AM, 180/78; 74/493, 492, 495; 280/775

[56] References Cited

U.S. PATENT DOCUMENTS

| | | | |
|---|---|---|---|
| 1,154,653 | 9/1915 | Pattison | 180/78 |
| 3,302,478 | 2/1967 | Pavwels | 180/78 |
| 3,520,209 | 7/1970 | Cescone | 180/78 |
| 3,737,003 | 6/1973 | Beals et al. | 180/78 |
| 3,800,903 | 4/1974 | Beals et al. | 74/493 |

Primary Examiner—John J. Love
Assistant Examiner—Donn McGiehan
Attorney, Agent, or Firm—Wegner, Stellman, McCord, Wiles & Wood

[57] ABSTRACT

An improved adjustable control console for a vehicle or the like of the type including a base (16) for attachment to a vehicle (12), a head (18), rigid mounting links (30,38) pivotally interconnecting the base and the head in a manner like that of a parallelogram linkage (16,18,28,33,34,38,40,42) to allow fore and aft movement of the console, at least one control element (22) movably mounted on the console, a rigid control link (50) connected to the control element and extending therefrom towards the base and including the improvement wherein the links are selectively simultaneously extensible to allow adjustment of the spacing between the head and the base.

6 Claims, 4 Drawing Figures

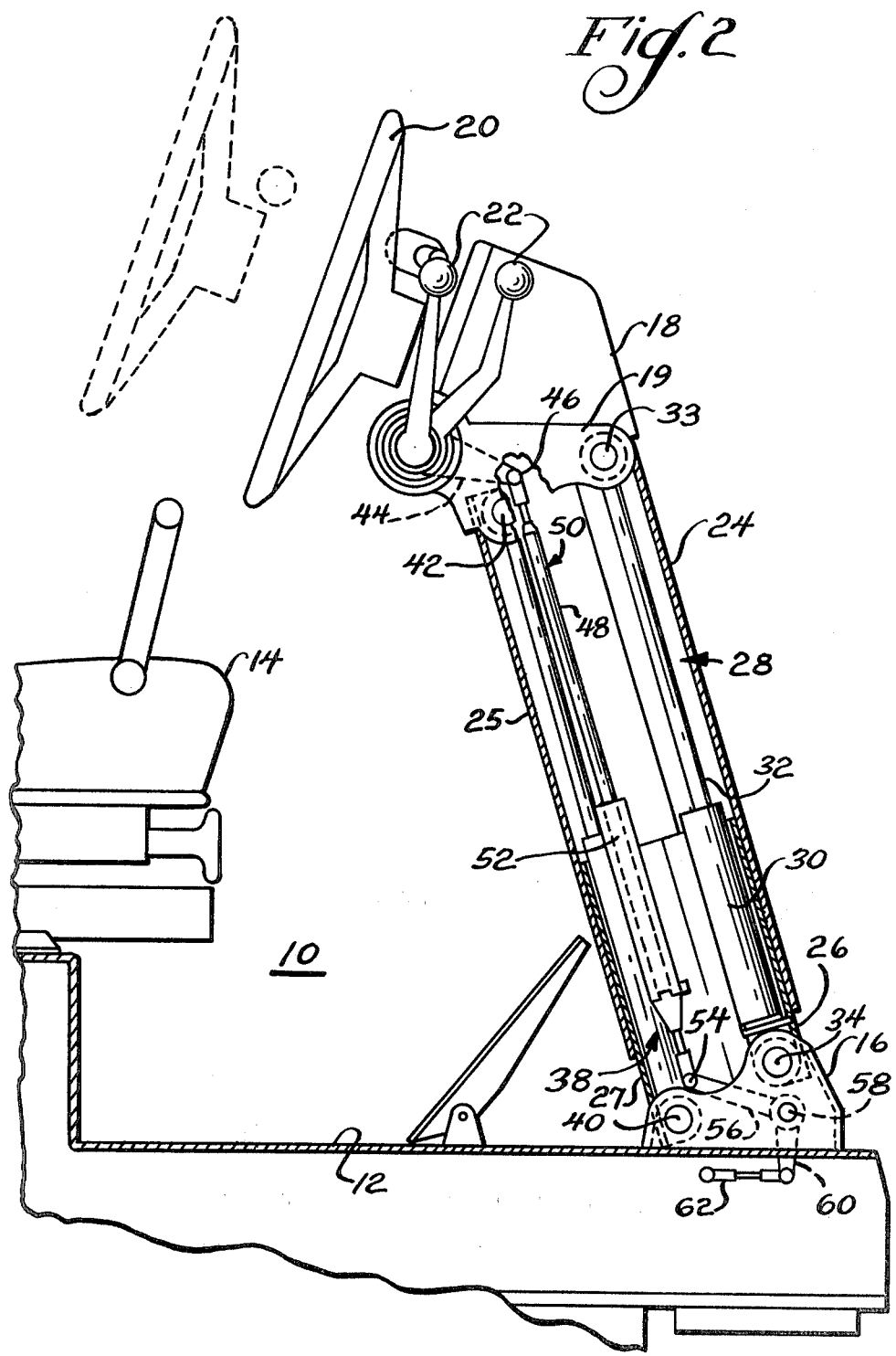

ADJUSTABLE CONTROL CONSOLE

DESCRIPTION

1. Technical Field

This invention relates to adjustable control consoles for use in vehicles or the like.

2. Background Art

The desirability of adjustable control consoles in, for example, vehicles or the like, has long been recognized. They are particularly suited for use in vehicles which may perform operations periodically requiring the operator to materially change his position within a cab or the like. They are also particularly suited for use in vehicles that are operated by different operators whose physical characteristics may vary considerably.

By way of example, vehicles such as motor graders are frequently operated by an operator assuming the standing position as well as by an operator assuming a sitting position. By providing for adjustment of the control console, regardless of the position assumed by the operator when operating the vehicle, the console may be made readily available to him.

Similarly, many vehicles are operated by different operators whose physical stature differs. The placement of a control console that is appropriate for an operator of relatively small stature may, and probably will, be quite inconvenient for an operator of larger stature. Thus, by providing for adjustability of the control console, convenient disposition of the same can be had for all operators.

In order to meet this need, Cescone, in U.S. Pat. No. 3,520,209 issued July 14, 1970, and Beals et al in U.S. Pat. No. 3,737,003 issued June 5, 1973 have proposed adjustable control console structures. Both provide an improvement over fixed control console structures but neither fully meet the need for adjustable control consoles for the foregoing purpose.

For example, Cescone provides for only side to side movement of but a single control device, namely, a steering wheel. Beals et al provides for fore and aft adjustment of a control console mounting a steering wheel as well as a variety of other controls.

DISCLOSURE OF THE INVENTION

In one aspect of the present invention, there is an adjustable control console for a vehicle or the like including a base for attachment to a vehicle, a head, rigid mounting links pivotally interconnecting the base and the head in a manner like that of a parallelogram linkage to allow fore and aft movement of the console, at least one control element movably mounted on the console, and a rigid control link connected to the control element and extending therefrom towards the base. The invention contemplates the improvement wherein the links are selectively simultaneously extensible to allow adjustment of the spacing between the console and the base.

Thus, in addition to fore and aft movement, the invention provides for, in the usual case wherein the base is mounted below the console, vertical adjustment as well. The console therefore may be drawn closer to an operating position occupied by an operator of small stature or moved away from the position when utilized by an operator of large stature. The same may be elevated when it is necessary to operate the apparatus with which the console is used from a standing position and may be lowered when the apparatus is to be operated from the sitting position. In addition, vertical adjustment may be made to accommodate operators of varying stature in either standing or sitting positions.

BRIEF DESCRIPTION OF DRAWINGS

FIG. 2 is an enlarged, side elevation of the adjustable control console with parts broken away and other parts shown in section for clarity;

BEST MODE FOR CARRYING OUT THE INVENTION

Figure 1:
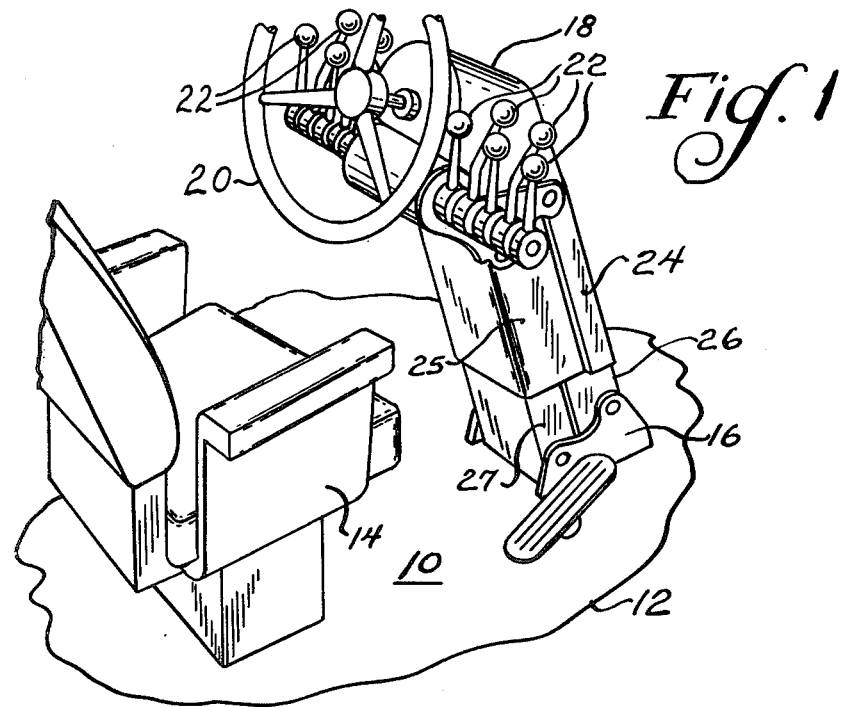
FIG. 1 is a fragmentary perspective view of an operator station including an embodiment of an adjustable control console of the present invention.

An exemplary embodiment of adjustable control console is illustrated in the drawings and with reference to FIG. 1 is seen to be disposed in an operator area 10 including a floor 12. The operator area 10 may be part of a vehicle cab or the like. Mounted within the area 10 is a chair 14 which may be occupied by the operator. The adjustable control console faces the operator chair 14 and includes a base 16 by which the console structure may be secured to the floor 12 or the like and a head portion 18. The head 18 is elevated above the base 16 but it is to be understood that other arrangements could be employed as desired.

The head 18 mounts a steering wheel 20 which may be connected by any suitable linkage to steerable wheels of the vehicle. The linkage could be mechanical, hydraulic, electrical or the like as desired.

The head 18 also mounts a plurality of manual actuators 22 which may be manually moved to any of a variety of positions to control various functions of which the vehicle is capable of performing. For example, if the vehicle is a motor grader, one of the actuators 22 could control moldboard height, another used to control the moldboard circle, still another to control the angular disposition of the front wheels with respect to the vehicle frame, etc.

Mounting structure to be described hereinafter interconnects the base 16 and the head 18 and is housed by a tubular upper housing adjoining the head 18 and formed of two, facing, overlapping, U-shaped channels 24 and 25 received on a lower, tubular housing, formed of two, somewhat smaller facing, overlapping, U-shaped channels 26 ad 27, in a telescoping fashion. The lower channels 26 and 27 adjoin the base 16. Thus, the length of the housing defined by the channels 24–27 can be changed by telescoping the upper housing on the lower housing while the width can change by telescoping the channels 25 and 27 into the channels 24 and 26 respectively.

Turning now to FIG. 2, the mounting structure contained within the housing 24–27 is shown in greater detail. In general, the same comprises a plurality of rigid links pivotally interconnecting the base 16 and the head 18 as a parallelogram linkage although it is to be understood that deviations from an absolute parallelogram linkage can be accommodated. A first mounting link 28 is provided and as seen in FIG. 2, its lower end comprises a hydraulic cylinder 30. A rod 32 of the cylinder 30 extends from the upper end of the latter and is connected by the upper part of the rod 32 to a pivot 33 on a bracket 19 forming part of the head 18. The head end of the cylinder 30 is connected via a pivot 34 to the base 16.

A second rigid mounting link is provided in the form of an additional hydraulic cylinder 38. The details of the cylinder 38 are omitted for clarity but it is to be understood that it can be constructed along the same lines as the cylinder 30. The cylinder 38 is pivoted at 40 to the base 16 and at 42 to the console 18.

The mounting links defined by the cylinders 30 and 38 are rigid in the sense that they cannot bend. However, it will be appreciated that the links are extensible by reason of the fact hydraulic cylinders are employed.

Figure 3:
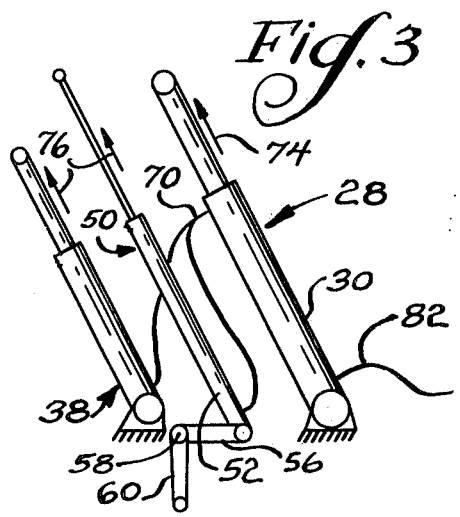
FIG. 3 is a schematic side elevation of the embodiment of the invention.

Each of the manual actuators 22 is in the form of a bell crank and includes an arm 44 pivotally connected at 46 to a further rigid link 50 which extends towards the base 16. The links 50 are rigid in the sense that they also cannot be bent but like the mounting links, are extensible by reason of their being hydraulic cylinders. Preferably, the rods 48 of the hydraulic cylinders will be connected to the pivot 46 while the cylinders 52 thereof will be pivoted at 54 to arms 56 of bellcranks disposed within the base 16. The bellcranks 56 are pivoted to the base or to other structure at 58 and have arms 60 which generally will extend through openings in the floor 12 (not shown) to be pivotally joined to control linkages 62 extending to components to be controlled as, for example, hydraulic valves or the like. The positions of the cranks 56 and arms 60 may be revised as shown in FIG. 3.

As can be appreciated from FIG. 2, the pivots 33, 34, 40 and 42 all define pivot axis which are generally transverse to the direction which an operator in the operator area 10 will face. Thus, the head 18 is mounted for fore and aft movement within the area, that is, movement towards and away from the seat 14. the path of such movement is not unlike that provided by the structure disclosed in the previously identified U.S. Letters Patent to Beals et al.

It will also be appreciated that the spacing between the head 18 and the base 16 may be altered. Thus, where the base 16 is mounted on the floor of the operator area 10, the head 18 may be elevated or lowered as desired to accommodate a standing operator or operators of varying stature. This is accomplished through extension of the cylinders 30, 38 and 52.

Of course, care must be taken to insure that during such changing of the spacing between the base 16 and the head 18, neither the position of the manual actuators 22 with respect to the head 18 or the angular position of the bellcrank 56 on the pivot 58 is altered as this could cause a change in the operation of the vehicle system being controlled by a given actuator if the bellcrank 56 were to be rotated or provide an erroneous indication of the degree of control provided over a particular vehicle operation by altering the position of the handle 22 with respect to the console 18.

Figure 4:
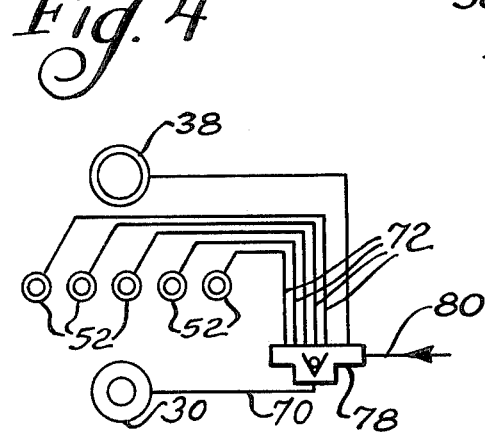
FIG. 4 is a hydraulic schematic.

Referring to FIGS. 3 and 4, there is illustrated a hydraulic system whereby each of the cylinders 30, 38 and 52 move equal incremental amounts in the same direction during the adjustment process to insure that the position of the bellcranks 56 or the manual actuators 22 is not altered during extension or retraction of the console in the vertical direction. In particular, the cylinder 30 is a master cylinder and a conduit 70 is connected to its rod end. The cylinders 38 and 52 act as slave cylinders and the conduit 70 or branches 72 thereof are connected to the head ends of the cylinders 38 and 52. Thus, when the rod of the cylinder 30 is moved in the direction of the arrow 74 in FIG. 3, hydraulic fluid will be expelled from its rod end and forced into the head ends of the cylinders 38 and 52. This in turn will cause the rods of the cylinders 38 and 52 to move in the same direction, that is, the direction shown by the arrow 76 in FIG. 3.

In order to insure that all cylinders move an equal incremental amount, the cross-sectional area of the fluid chamber at the rod end of the cylinder 30 is equal to the sum of the cross-sectional areas of the slave cylinders 38 and 52 at their head ends. All cylinders, of course, have constant cross-sectional areas and thus, by reason of the relatively incompressible nature of hydraulic fluid, the volume of fluid directed out of the cylinder 30 will require an equal increase in the volume of the fluid chambers of the cylinders 38 and 52 causing an equal extension of their rods.

In order to lock the system in a given position of adjustment as well as to prevent cross flow from one slave cylinder to the other as, for example, when an actuator 22 associated with one of the cylinders is moved which would tend to either increase or decrease its volume, there is provided an isolating means. The isolating means is in the form of a pilot operated check valve 78 interconnecting the conduit 70 and the branches 72. The check valve 78 isolates each of the branches 72 from each other as well as from the conduit 70. When it is desired to make an adjustment, fluid under pressure from any suitable force may be directed to the check valve 78 via a conduit 80 to cause the same to open and allow free flow. For the specific configuration illustrated, increasing of the distance between the base 16 and the head 18 can be had without applying pressure fluid to the conduit 80 while decreasing of the spacing will require the application of pressure fluid to the valve 78.

It is also contemplated that the spacing adjustment between the head 18 and the base 16 may be powered to minimize operator effort. To this end, fluid under pressure, which may be either hydraulic or pneumatic, may be applied from any suitable source via a suitable control valve to the head end of the cylinder 30 via a conduit 82. This will cause extension of the console under power. Retraction of the console for the specific form illustrated generally need not be powered since the force of gravity will tend to cause the head 18 to lower whenever the check valve 78 is opened by application of pressure thereto. However, if a powered return is desired, it would only be necessary to utilize double acting cylinders as the cylinders 38 and 52 and apply fluid under pressure to the rod ends of those cylinders to effect a powered retraction.

INDUSTRIAL APPLICABILITY

The adjustable console may be used, for example, in motor graders. Fore and aft adjustment of the head 18 may be had without effecting control settings by reason of the parallelogram linkage. Thus, an operator of small stature may draw the head 18 to a position relatively close to the chair while an operator of large stature may shift the head 18 to a position more remote from the chair 14. When the operations being performed by the motor grader require the operator to stand, he may move the head 18 away from the chair sufficiently so as to provide standing room and may elevate the head 18 in the manner previously mentioned. The degree to such elevation can be suitably controlled in the manner stated to readily adjust the system for a tall operator as well as for a short operator.

Thus, it will be appreciated, that the invention provides a considerable advantage over the structure disclosed in the previously identified Cescone patent in that not only steering, but other operational functions can be located on a control console which is readily adjusted. The invention also provides a considerable advantage over the structure disclosed in the previously identified Beals et al patent in that not only is fore and aft adjustment provided, but vertical adjustment as well.

I claim:

1. An adjustable control console for a vehicle or the like including a base for attachment to a vehicle, a member, rigid mounting links pivotally interconnecting the base and the member in a manner like that of a parallelogram linkage to allow fore and aft movement of the member, at least one control element movably mounted on the member, and a rigid control link connected to the control element and extending therefrom toward said base, said links being selectively simultaneously extensible to allow adjustment of the spacing between said member and said base.

2. The adjustable control console of claim 1 wherein said links comprise hydraulic cylinders.

3. The adjustable control console of claim 1 wherein said links comprise hydraulic cylinders, at least one of said mounting links comprising a master cylinder and the remainder of said links comprising slave cylinders.

4. The adjustable control console of claim 1 wherein said links comprise hydraulic cylinders, at least one of said mounting links comprising a master cylinder and the remainder of said links comprising slave cylinders, the cross sectional area of the fluid chamber(s) of said master cylinder(s) being equal to the sum of the cross sectional areas of the fluid chambers of said slave cylinders, and conduit means, interconnecting said fluid chambers, such that movement of said master cylinder(s) in one direction to decrease its volume will cause hydraulic fluid to be directed therefrom to the fluid chambers of said slave cylinders to increase their volume and to cause an equal movement of said slave cylinders in said one direction or vice versa.

5. The adjustable control console of claim 4 further including isolating means in said conduit means for normally preventing cross flow of hydraulic fluid between said slave cylinders.

6. The adjustable control console of claim 5 wherein said isolating means includes a check valve.

* * * * *